(12) United States Patent
Irie

(10) Patent No.: US 6,941,834 B2
(45) Date of Patent: Sep. 13, 2005

(54) BICYCLE COMPONENT OPERATING DEVICE

(75) Inventor: Yoshinori Irie, Sayama (JP)

(73) Assignee: Shimano Inc., Osaka (JP)

( * ) Notice: Subject to any disclaimer, the term of this patent is extended or adjusted under 35 U.S.C. 154(b) by 27 days.

(21) Appl. No.: 10/338,698

(22) Filed: Jan. 9, 2003

(65) Prior Publication Data

US 2003/0094068 A1 May 22, 2003

Related U.S. Application Data

(62) Division of application No. 09/818,541, filed on Mar. 28, 2001, now Pat. No. 6,546,827.

(51) Int. Cl.$^7$ ................................................ F16H 7/22
(52) U.S. Cl. ........................................ 74/551.1; 74/489
(58) Field of Search ...................... 74/489, 475, 502.2, 74/488, 551.8, 551.3, 551.2, 551.4, 551.5, 551.6, 551.7, 500.5, 551.1; 482/57, 61

(56) References Cited

U.S. PATENT DOCUMENTS

| | | | |
|---|---|---|---|
| 4,071,892 A | * | 1/1978 | Genzling ..................... 701/200 |
| 5,165,301 A | * | 11/1992 | Jeshurun et al. ............ 74/551.1 |
| 5,285,696 A | * | 2/1994 | Taylor ......................... 74/551.1 |
| 5,358,451 A | | 10/1994 | Lacombe et al. |
| 5,470,277 A | | 11/1995 | Romano |
| 5,676,021 A | * | 10/1997 | Campagnolo ................. 74/489 |
| 6,015,036 A | | 1/2000 | Fukuda |
| 6,216,078 B1 | | 4/2001 | Jinbo et al. |
| 6,485,396 B2 | * | 11/2002 | Stevens ........................ 482/58 |
| 6,584,872 B1 | * | 7/2003 | Kojima ...................... 74/551.8 |
| 2001/0053724 A1 | | 12/2001 | Campagnolo |

FOREIGN PATENT DOCUMENTS

FR    2 654 698 A1    5/1991

OTHER PUBLICATIONS

Mavic All Catalogue 1999, Published in Japan before Nov. 5, 1998.

* cited by examiner

Primary Examiner—Matthew C. Graham
(74) Attorney, Agent, or Firm—Shinjyu Global IP Counselors, LLP

(57) ABSTRACT

An outer gripping portion of a bicycle handlebar includes a mounting section and a bracket section. The mounting section has a first cross-sectional shape. The bracket section has a second cross-sectional shape and is releasably coupled to the mounting section to form a first gripping section. The first and second cross-sectional shapes of the mounting section and the bracket section have flush longitudinal edges that mate together to form a first annular gripping surface of the first gripping section. Preferably, the bicycle handlebar includes a pair of outer gripping portions coupled to opposite ends of a transverse portion.

3 Claims, 10 Drawing Sheets

US 6,941,834 B2

BICYCLE COMPONENT OPERATING DEVICE

CROSS-REFERENCE TO RELATED APPLICATIONS

This application is a divisional application of U.S. patent application Ser. No. 09/818,541, filed on Mar. 28, 2001, now U.S. Pat. No. 6,546,827. The entire disclosure of U.S. patent application Ser. No. 09/818,541 is hereby incorporated herein by reference.

BACKGROUND OF THE INVENTION

1. Field of the Invention

This invention generally relates to a bicycle handlebar. More specifically, the present invention relates an aerodynamic bicycle handlebar with a gripping section formed by a mounting section and a bracket section mounted flush with the mounting section to form a continuous annular gripping surface.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle handlebar. Bicycle handlebars are constantly being redesigned to be lightweight and more aerodynamic in design as well as to be simple to manufacture and assemble. Bicycle handlebars are also being redesigned to allow increased comfort for the rider and efficient power transfer to the bicycle.

There are many different types of bicycle handlebars, which are currently available on the market. The most basic bicycle handlebars include a stem portion coupled to the front fork of the bicycle and a linear cross-bar rigidly coupled to the stem portion. Alternatively, a curved cross-bar is sometimes utilized on certain types of bicycles. These curved cross-bars typically have a linear portion with a curved portion formed at each end of the linear portion. In any case, the cross-bar is usually tubular member with brake operating devices, derailleur operating devices and cycle-computers (optionally) coupled to the cross-bar so the rider can control the various components of the bicycle. The component operating devices are typically coupled to the cross-bar with conventional tubular clamping members. These prior handlebars are sometimes uncomfortable, prevent efficient power transfer to the drivetrain of the bicycle, and contribute to increased air drag forces.

Recently, riders have attached additional bar portions to the conventional handlebars in order to increase power transfer, aerodynamics and/or comfort. These additional bar portions can be useful in a variety of riding situations. However, it can be difficult for the rider to control brake operating devices, derailleur operating devices and cycle-computers (optionally) when using these attachments or additional bars. Additionally, these attachments can be cumbersome, difficult to install and relatively heavy. Moreover, these attachments do not always allow efficient power transfer from the rider to the drive train of the bicycle. Furthermore, these attachments do not always minimize air drag forces and can be uncomfortable for the rider.

In view of the above, there exists a need for aerodynamic handlebar which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle handle bar, which contributes to improved aerodynamic characteristics for the cyclist.

Another object of the present invention is to provide a bicycle handle bar with improved ergonomics.

Another object of the present invention is to provide a bicycle handlebar, which provides several holding positions yet is relatively lightweight.

Still another object of the present invention is to provide a bicycle handlebar, which is relatively simple and inexpensive to manufacture and assemble.

The foregoing objects can basically be attained by providing an outer Dripping portion of a bicycle handlebar comprising a mounting section and a bracket section. The mounting section has a first cross-sectional shape. The bracket section has a second cross-sectional shape and is releasably coupled to the mounting section to form a first gripping section. The first and second cross-sectional shapes of the mounting section and the bracket section have flush longitudinal edges that mate together to form a first annular gripping surface of the first gripping section.

The foregoing objects can also basically be attained by providing bicycle handlebar comprising a transverse portion, a first outer gripping portion and a second outer gripping portion. The transverse portion has a first end, a second end and a mounting part therebetween. The first outer gripping portion is coupled to the first end of the transverse portion and includes a first mounting section with a first cross-sectional shape and a first bracket section with a second cross-sectional shape. The first bracket section is releasably coupled to the first mounting section to form a first gripping section. The first and second cross-sectional shapes of the first mounting section and the first bracket section have flush longitudinal edges that mate together to form a first annular gripping surface of the first gripping section. The second outer gripping portion is coupled to the second end of the transverse portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
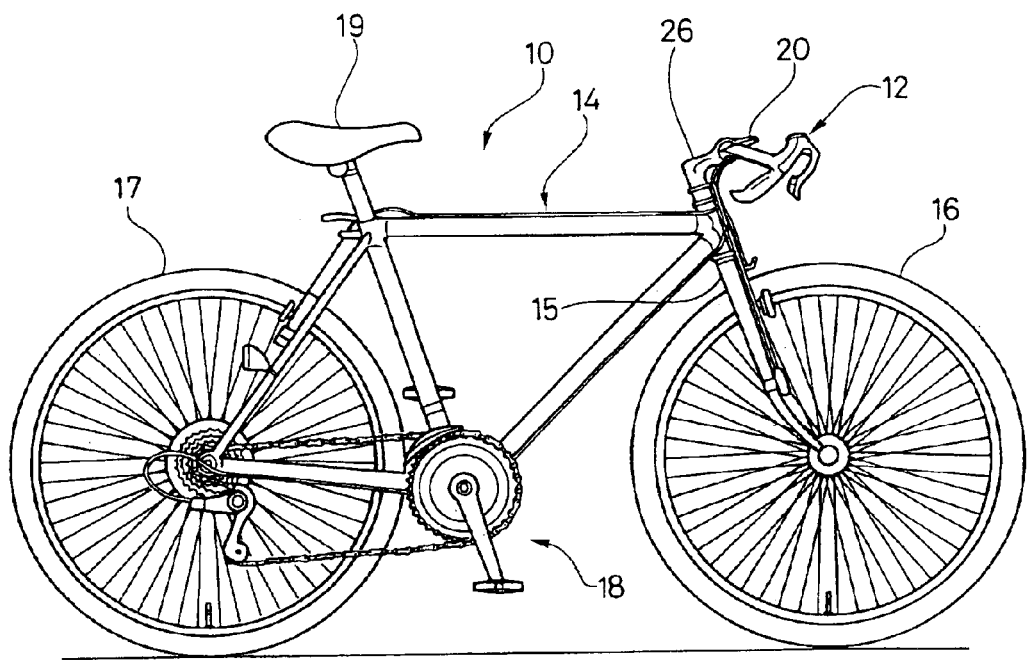
FIG. 1 is a side elevational view of a bicycle with a handlebar in accordance with a preferred embodiment of the present invention.
Figure 2:
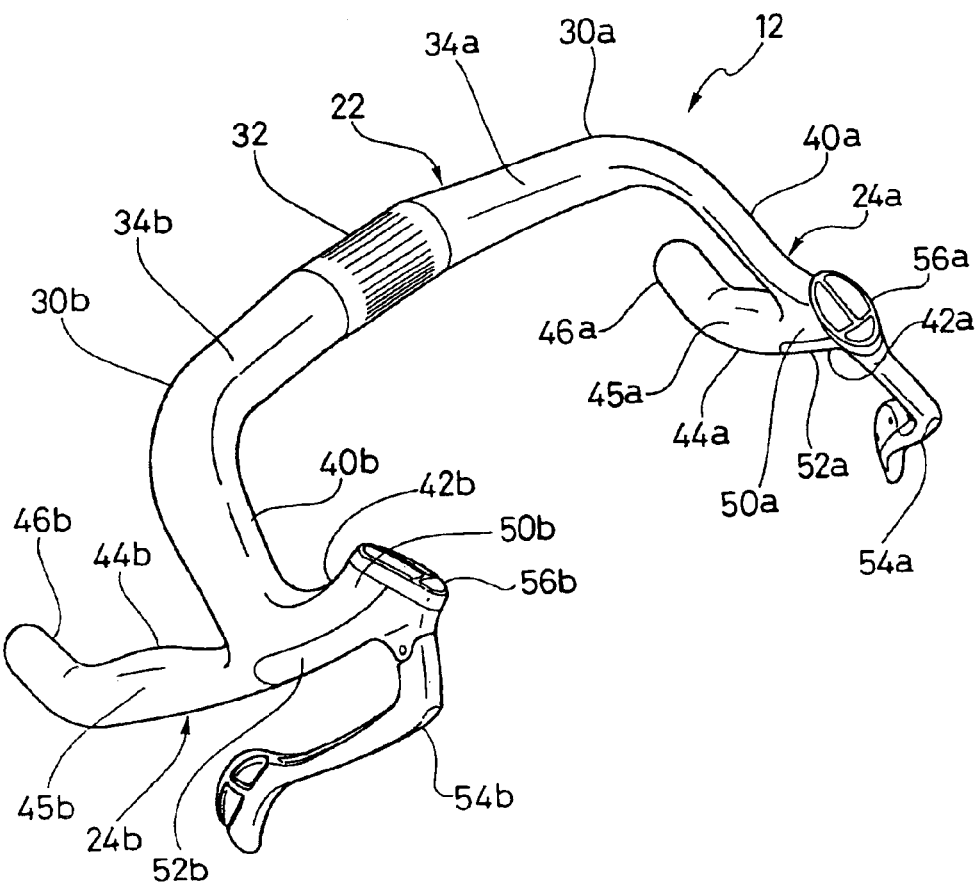
FIG. 2 is an enlarged, perspective view of the bicycle handlebar illustrated in FIG. 1.

Referring initially to FIG. 1, a bicycle 10 is illustrated with a handlebar 12 in accordance with a preferred embodiment of the present invention. Bicycle 10 basically includes a frame 14, with a front fork 15, a front wheel 16, a rear wheel 17, a drive train 18, a seat 19 and a cycle computer 20. Bicycle 10 and its various components are well known in the prior art, except for the handlebar 12. Thus, bicycle 10 and its various components will not be discussed or illustrated in detail herein, except for the components that relate to the present invention. Moreover, various conventional bicycle parts such as brakes, or drive trains, etc., which are not illustrated and/or discussed in detail herein, can be used in conjunction with the present invention.

As used herein, the following directional terms "forward", "rearward", "above", "downward", "vertical", "horizontal", "below" and "transverse" as well as any other similar directional terms refer to those directions of a bicycle in its normal riding position. Accordingly, these terms, as utilized to describe the present invention should be interpreted relative to bicycle 10 in its normal riding position.

Referring to FIGS. 1–4, bicycle handlebar 12 basically includes a transverse portion 22 and a pair (first and second) of outer gripping portions 24a and 24b. Transverse portion 22 is preferably fixedly coupled to a stem support 26 in a conventional manner. Stem support 26 is fixedly coupled to front fork 15 of bicycle frame 14 in a conventional manner. Thus, handlebar 12 is utilized to steer front wheel 16 via front fork 15 in a conventional manner.

Figure 5:
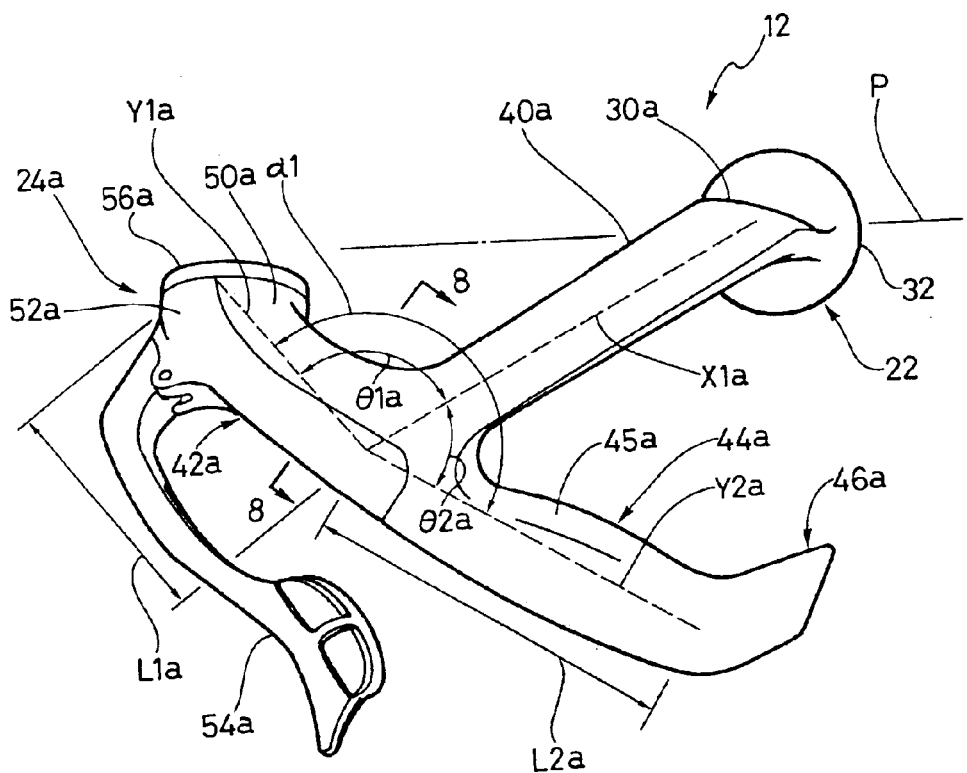
FIG. 5 is a left side elevational view of the bicycle handlebar illustrated in FIGS. 1–4.
Figure 9:
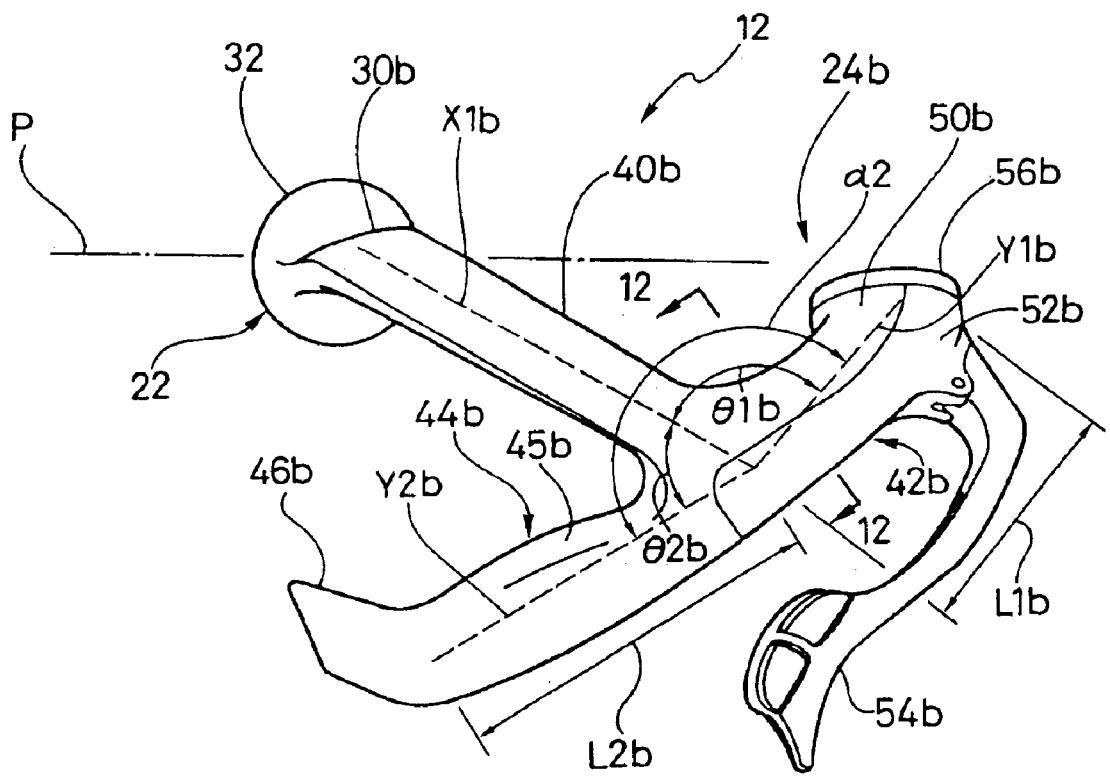
FIG. 9 is a right side elevational view of the bicycle handlebar illustrated in FIGS. 1–5.
Figure 10:
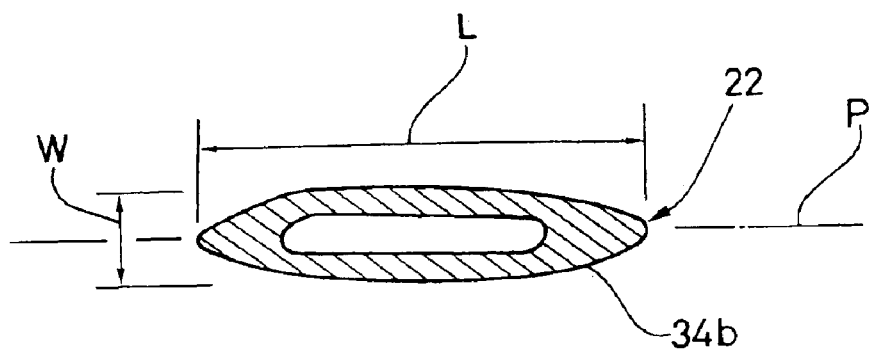
FIG. 10 is a partial cross-sectional view of the handlebar illustrated in FIGS. 1–5 as viewed along section line 10—10 of FIG. 3.

As seen in FIGS. 5 and 9, outer gripping portions 24a and 24b are preferably mirror images of each other. Moreover, handlebar 12 is preferably substantially symmetrical relative to a center vertical plane C of transverse portion 22. Center vertical place C forms a center vertical plane of bicycle 10 when bicycle 10 is in its normal riding position. However, when handlebar 12 is moved to steer front wheel 16, center vertical plane C rotates relative to the center vertical plane of the bicycle 10.

Transverse portion 22 basically includes a pair (first and second) of ends 30a and 30b with a mounting portion (mounting part) or member 32 arranged therebetween. Transverse portion 22 has a pair of gripping surfaces 34a and 34b formed on opposite sides of mounting member 32, respectively. Cycle computer 20 is preferably coupled to one of the gripping surfaces 34a or 34b in a conventional manner such as by a hook and loop connection or any other conventional attachment method. The mounting member 32 is configured to fixedly couple transverse portion 22 to stem support 26 in a conventional manner. Specifically, mounting member 32 has a substantially circular shape such that transverse portion 22 can be coupled to a tubular clamping portion of stem support 26 in a conventional manner. Thus, the connection between transverse portion 22 and stem support 26 will not be discussed or illustrated in detail herein. Rather, it will be apparent to those skilled in the art that other types of connections between transverse portion 22 and stem support 26 could be utilized as needed and/or desired.

Figure 3:
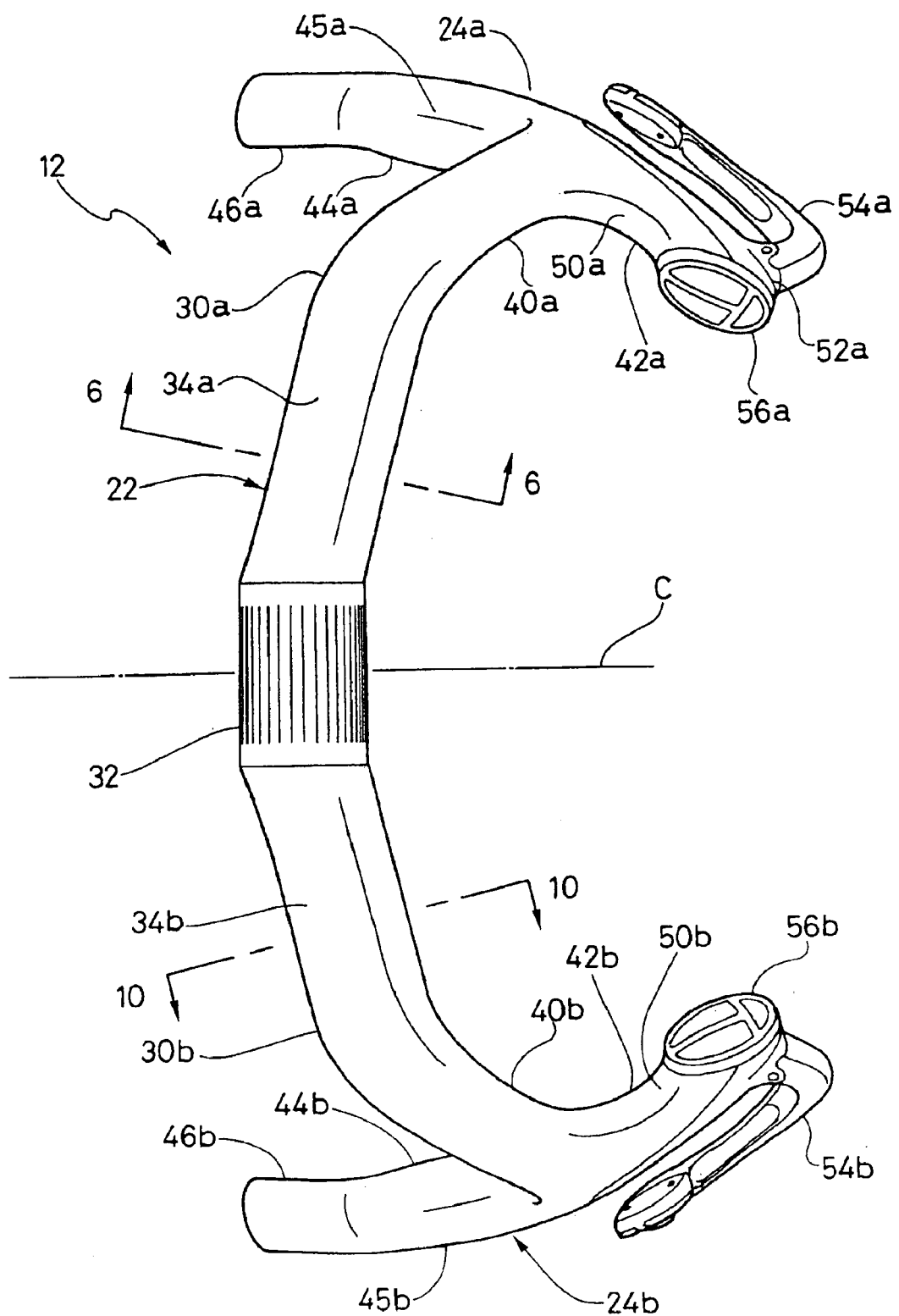
FIG. 3 is an enlarged, top plan view of the bicycle handlebar illustrated in FIGS. 1 and 2.

Transverse portion 22 is preferably formed of lightweight metallic material such as aluminum, titanium or any other known material in a conventional manner. In the illustrated embodiment, transverse portion 22 is formed with interior hollow areas (not discussed or illustrated in detail herein) to allow wires and/or cables to pass therethrough as needed and/or desired. However, it will be apparent to those skilled in the art from this disclosure that transverse portion 22 could be formed as a solid member if needed and/or desired. Transverse portion 22 preferably has a substantially V-shape as seen in FIG. 3. Additionally, transverse portion 22 preferably has an aerodynamic cross-sectional shape.

Figure 6:
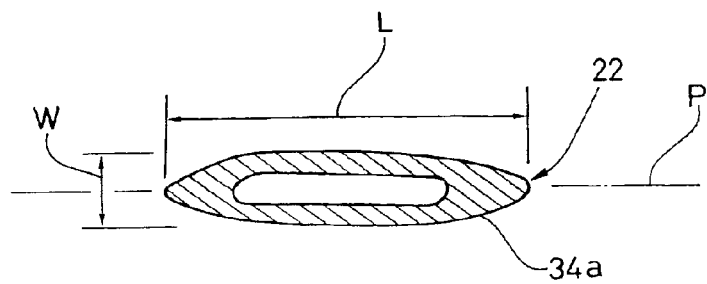
FIG. 6 is a partial cross-sectional view of the handlebar illustrated in FIGS. 1–5 as viewed along section line 6—6 of FIG. 3.

Specifically, as seen in FIGS. 3–6, 9 and 10, transverse portion 22 has a noncircular cross-section with a first dimension L measured in a direction parallel to a mid-plane P and a second dimension W smaller than first dimension L. In other words, transverse portion 22 has a low profile, except for mounting member 32, which is substantially circular shaped. More specifically, first dimension L is preferably a transverse maximum cross-sectional dimension of transverse portion 22. Mid-plane P is a substantially horizontal plane parallel to the measurement direction of dimension L of transverse portion 22. Thus, mid-plane P is substantially perpendicular to center vertical plane C. As seen in FIG. 6, the second transverse dimension W is measured in a direction substantially perpendicular to mid-plane P. However, it will be apparent to those skilled in the art that transverse portion 22 could have other configurations as needed and/or desired. In any event, transverse portion 22 preferably has an aerodynamic shape with a first dimension L larger than a second dimension W as seen in cross-section.

As mentioned above, first and second outer gripping portions 24a and 24b are preferably mirror images of each other. Preferably, outer gripping portions 24a and 24b are formed with interior hollow areas (not shown) to allow wires and/or cables to pass therethrough as needed and/or desired. However, it will be apparent to those skilled in the art from this disclosure that outer gripping portions 24a and 24b could be formed as solid members if needed and/or desired. Specifically, first outer gripping portion 24a basically includes an attachment section 40a, a first gripping section 42a, and a second gripping section 44a, as best seen in FIGS. 2–5. Attachment section 40a is fixedly coupled to end 30a of transverse portion 22. Attachment section 40a has a center longitudinal axis X1a that is inclined relative to mid-plane P of transverse portion 22. First gripping section 42a extends outwardly from attachment section 40a and has a center longitudinal axis Y1a. Second gripping section 44a also extends outwardly from attachment section 40a and has a center longitudinal axis Y2a. First and second gripping sections 42a and 44a preferably extend in substantially opposite directions from each other. Additionally, outer gripping portion 24a preferably includes a bent section 46a formed at a free end of second gripping section 44a. Second gripping section 44a preferably has a bulged gripping surface or a bulged area 45a at its free end.

Figure 4:
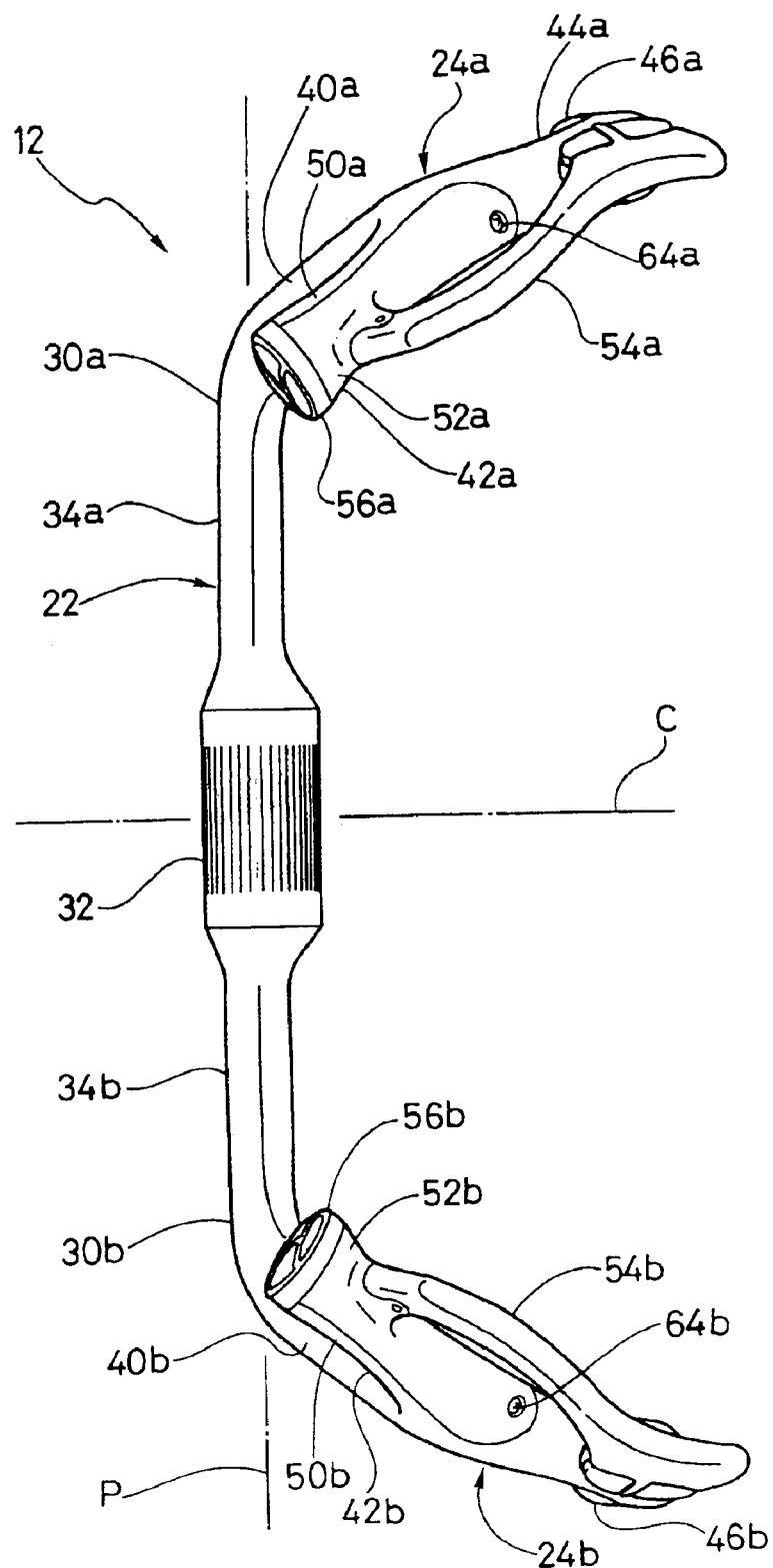
FIG. 4 is a bottom plan view of the bicycle handlebar illustrated in FIGS. 1–3.

Attachment section 40a is configured such that first and second gripping sections 42a and 44a are substantially located on one side of mid-plane P, as seen in FIG. 5. More specifically, central longitudinal axis X1a of attachment section 40a is inclined relative to mid-plane P and extends outwardly from center vertical plane C, as seen in FIGS. 3 and 4. Moreover, center longitudinal axis X1a of attachment section 40a also extends substantially in a forward direction relative to transverse portion 22 in the preferred mounting arrangement. Thus, first and second gripping sections 42a and 44a are preferably located substantially below mid-plane P of transverse portion 22. Attachment section 40a preferably has substantially the same cross-sectional shape as transverse portion 22 (i.e. gripping surface 34a). Therefore, attachment section 40a also has an aerodynamic shape.

First gripping section 42a is a rod shaped member, preferably formed of two pieces, as discussed below in more detail. Central longitudinal axis Y1a of first gripping section 42a is preferably angled relative to central longitudinal axis X1a of attachment section 40a to form a first angle θ1a, which is larger than 90 degrees. Preferably, angle θ1a is approximately 95 degrees. Additionally, central longitudinal axis Y2a of second gripping section 44a is angled relative to central longitudinal axis X1a of attachment section 40a to form and angle θ2a, which is less than 90 degrees. Preferably, angle θ2a is approximately 75 degrees. Moreover, central longitudinal axis Y1a of first gripping section 42a is angled between about 25 degrees and about 35 degrees relative to center vertical plane C.

First and second gripping sections 42a and 44a are preferably angled relative to each other to form an angle al between central longitudinal axes Y1a and Y2a. Angle α1 is preferably larger than about 135 degrees and smaller than about 180 degrees. More specifically, angle α1 is preferably larger than about 150 degrees and smaller than about 170 degrees (i.e. approximately 160 degrees). Thus, central longitudinal axis Y1a of first gripping section 42a and central longitudinal axis X1a of attachment section 40a lie in a first plane, while central longitudinal axis Y2a of second gripping section 44a and central longitudinal axis X1a of attachment section 40a lie in a second plane. In other words, the first plane preferably intersects the second plane such that angle α1 is less than θ1a+θ2a (i.e. less than approximately 170 degrees).

First and second gripping sections 42a and 44a each have a longitudinal length sufficient to provide a comfortable ergonomic gripping surface for at least a portion of a cyclist's hand. Specifically, first gripping section 42a preferably has a longitudinal length L1a and second gripping section 44a has a second longitudinal length L2a. Second longitudinal length L2a is preferably approximately 50 percent longer than first longitudinal length L1a, as seen in FIG. 5. In other words, second longitudinal length L2a is preferably about 1.5 times as long as first longitudinal length L1a. More specifically, longitudinal length L1a of first gripping section 42a is preferably approximately 80 millimeters. Thus, second longitudinal length L2a of second gripping section 44a is preferably about 120 millimeters. Therefore, first and second gripping sections 42a and 44a are sufficiently long to provide first and second annular gripping surfaces for the cyclist's hands.

Figure 7:
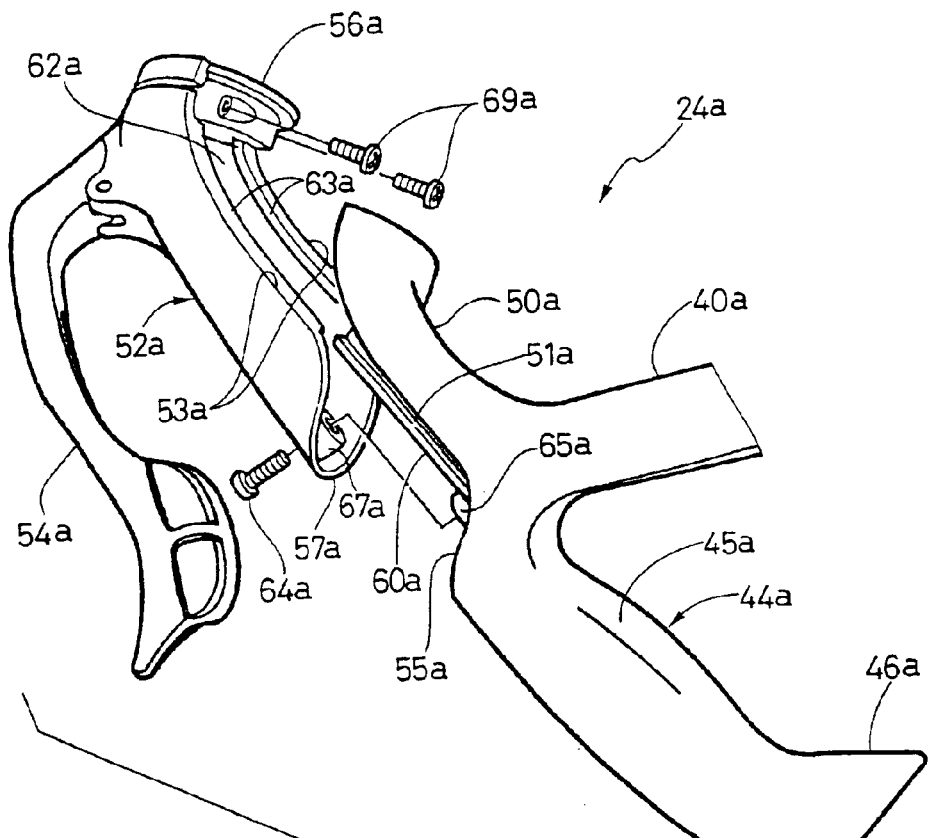
FIG. 7 is an enlarged, exploded reverse perspective view of an outer gripping portion of the bicycle handlebar illustrated in FIGS. 1–5.
Figure 8:
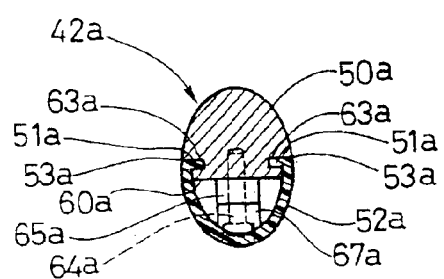
FIG. 8 is a partial cross-sectional view of the bicycle handlebar illustrated in FIGS. 1–5 and 7 as viewed along section line 8—8 of FIG. 5.

Referring now to FIGS. 5, 7 and 8, first gripping section 42a will be discussed in more detail. First gripping section 42a is preferably formed of two pieces releasably coupled together as mentioned above. Specifically, first gripping section 42a preferably includes a first mounting section 50a and a first bracket section 52a. Mounting section 50a is preferably integrally formed with attachment section 40a, which is preferably integrally formed with transverse portion 22. Moreover, second gripping section 44a is also preferably integrally formed with attachment section 40a, which is preferably integrally formed with transverse portion 22. Thus, handlebar 12 is preferably formed as a one-piece unitary member, as described below in more detail.

Bracket section 52a is preferably formed of hard, rigid plastic material and is releasably coupled to mounting section 50a to form first gripping section 42a. More specifically, mounting section 50a has a first cross-sectional shape (i.e. substantially semi-circular cross-sectional shape) and bracket section 52a has a second cross-sectional shape (i.e. substantially semi-circular cross-sectional shapes). Mounting section 50a and bracket section 52a have flush longitudinal (axial) edges 51a and 53a, respectively. Mounting section 50a includes a pair of longitudinal edges 51a, while bracket section 52a includes a pair of longitudinal edges 53a. These flush longitudinal (axial) edges 51a and 53a mate together to form an annular gripping surface of first gripping section 42a. Additionally, mounting section 50a includes a curved transverse edge 55a, while bracket section 52a includes a mating curved transverse edge 57a, which mate to form a smooth transition from first gripping section 42a to second gripping section 44a. Thus, when bracket section 52a is coupled to mounting section 50a, flush longitudinal edges 51a and 53a are aligned with each other to form a continuous, smooth contoured annular gripping surface (i.e. of first gripping section 42a) with a smooth transition to the second gripping section 44a.

In this embodiment, bracket section 52a is releasably coupled to mounting section 50a by a protrusion in recess arrangement. Specifically, as seen in FIGS. 7 and 8, mounting section 50a includes a longitudinal T-shaped projection 60a extending therefrom and bracket section 52a includes a longitudinal recess or mating slot 62a configured to slidably receive longitudinal projection 60a. More specifically, bracket section 52a preferably has a hollow area. Slot 62a is preferably formed by a pair of opposed flanges 63a. A threaded fastener or bolt 64a is used to fixedly couple bracket section 52a to mounting section 50a.

Mounting section 50a also preferably includes an abutment protrusion 65a and bracket section 52a preferably includes an abutment protrusion 67a, which contact each other within the hollow area of bracket section 52a. Abutment protrusions 65a and 67a have holes, which are configured to threadedly receive threaded fastener 64a. Of course, it will be apparent to those skilled in the art that other connections between mounting section 50a and bracket section 52a could be utilized. For example, the protrusion in recess arrangement of mounting section 50a and bracket section 52a could be reversed if needed and/or desired. Moreover, other types of protrusion and recess arrangements could be utilized to releasably couple bracket section 52a to mounting section 50a, as discussed below in reference to another preferred embodiment of the present invention.

Bracket section 52a preferably includes a first control lever 54a pivotally coupled thereto for controlling a braking device in a conventional manner. Control lever 54a is a brake control lever, which is operatively coupled to a braking device (i.e. front braking device) of bicycle 10 in a conventional manner. For example, control lever 54a could be operatively coupled to the front brake device via a system of cables, or electronically. Control lever 54a preferably includes a pair of shift control buttons for controlling a derailleur of the bicycle 10 (i.e. the front derailleur).

The shift control buttons of control lever 54a are preferably electrically or mechanically coupled to the respective derailleur via a control cable or electrical wires in a conventional manner. Moreover, the shift control buttons are preferably electrically coupled to the cycle computer 20 in a conventional manner. The connections between control lever with the shift buttons with the braking device, derailleur and cycle computer are not critical to the present invention. Thus, these connections will not be discussed or illustrated in detail herein. Rather, it will be apparent to those skilled in the art that any suitable connections could be utilized as needed and/or desired.

A first user operable control unit 56a is coupled to a free end of first gripping section 42a. Specifically, user operable control unit 56a is fixedly coupled to bracket section 52a via a pair of threaded fasteners or screws 69a. More specifically, mounting section 50a and bracket section 52a each have free ends configured to form a recess at the free end of first gripping section 42a. User operable control unit 56a is preferably at least partially received in the recess formed at the free end.

User operable control unit 56a is preferably operatively coupled to the respective derailleur of the bicycle 10 and the cycle computer 20 to control the shifting function of the front derailleur in a conventional manner (and in a manner similar to the shift control buttons of control lever 54a). For example, user operable control unit 56a could be electronically or mechanically operatively coupled to the respective derailleur (i.e. front derailleur) of bicycle 10. Additionally, user operable control unit 56a preferably includes a computer-control button (i.e. such as a start/stop button). The connections between user operable control unit 56a with the respective derailleur and cycle computer are not critical to the present invention. Thus, these connections will not be discussed or illustrated in detail herein. Rather, it will be apparent to those skilled in the art that any suitable connections could be utilized as needed and/or desired.

As mentioned above, outer gripping portions 24a and 24b are substantially mirror images of each other. Specifically, outer gripping portion 24b basically includes a second attachment section 40b with a center longitudinal axis Y1b, a first gripping section 42b with a center longitudinal axis X1b, and a second gripping section 44b with a center longitudinal axis Y2b, as best seen in FIGS. 2–4 and 9. Additionally, outer gripping portion 24b preferably includes a bent section 46b formed at a free end of second gripping section 44b. Second gripping section 44b preferably has a bulged gripping surface or a bulged area 45b.

First gripping section 42b is a substantially rod shaped member, preferably formed of two pieces. Central longitudinal axis Y1b of first gripping section 42b is preferably angled relative to central longitudinal axis X1b of attachment section 40b to form a first angle θ1b, which is preferably, approximately 95 degrees. Also, central longitudinal axis Y2b of second gripping section 44b is angled relative to central longitudinal axis X1b of attachment section 40b to form and angle θ2b, which is preferably approximately 75 degrees. Moreover, central longitudinal axis Y1b of first gripping section 42b is also angled between about 25 degrees and about 35 degrees relative to center vertical plane C. First and second gripping sections 42b and 44b are preferably angled relative to each other to form an angle α2 between central longitudinal axes Y1b and Y2b. Angle α2 is preferably larger than about 135 degrees and smaller than about 180 degrees. More specifically, angle α2 is preferably larger than about 150 degrees and smaller than about 170 degrees (i.e. approximately 160 degrees).

First and second gripping sections 42b and 44b have longitudinal lengths L1b and L2b, with length L2b being preferably approximately 50 percent longer than length L1b. More specifically, length L1b is preferably approximately 80 millimeters, while length L2b is preferably about 120 millimeters.

Figure 11:
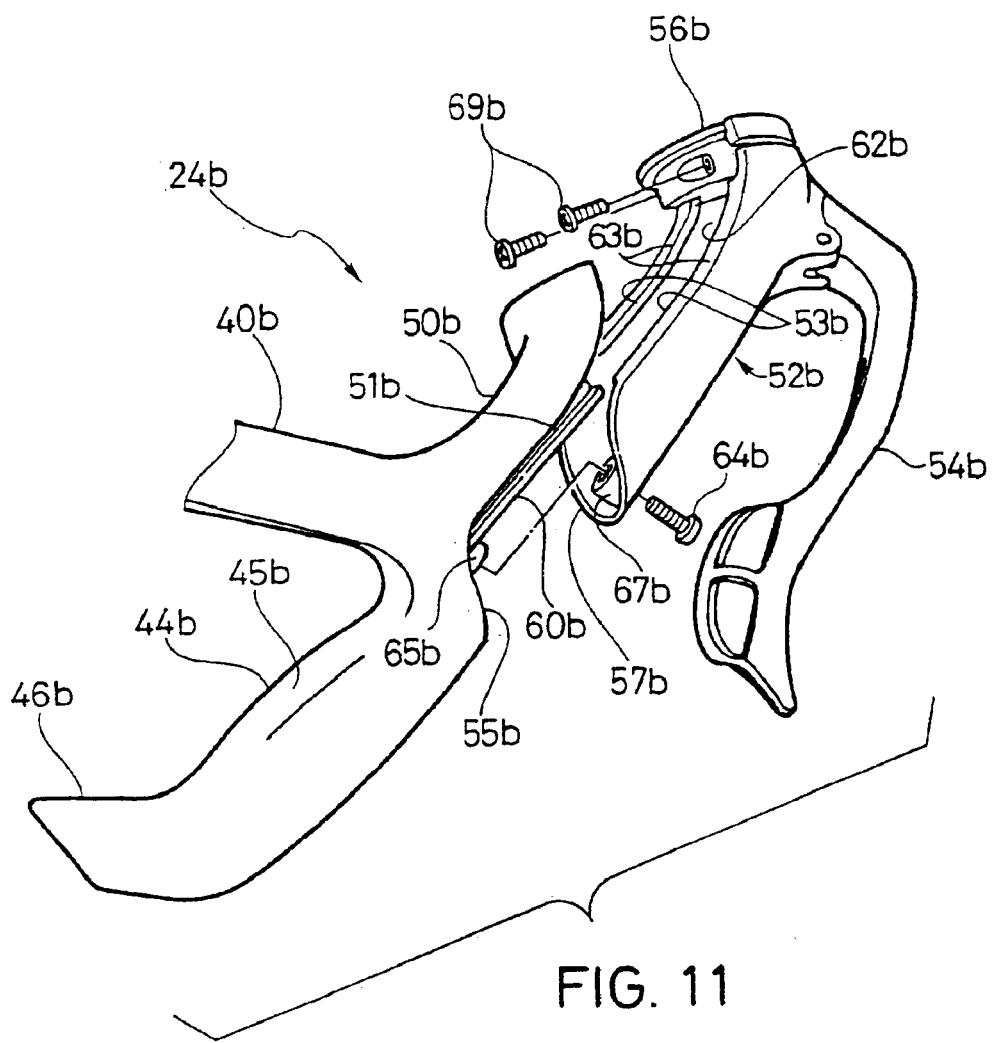
FIG. 11 is an enlarged, exploded perspective view of another outer gripping portion of the bicycle handlebar illustrated in FIGS. 1–5 and 9.
Figure 12:
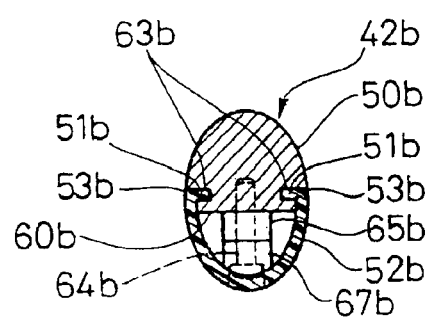
FIG. 12 is a partial cross-sectional view of the bicycle handlebar illustrated in FIGS. 1–5, 9 and 11 as viewed along section line 12—12 of FIG. 9.

Referring now to FIGS. 9, 11 and 12, first gripping section 42b preferably includes a second mounting section 50b and a second bracket section 52b. Mounting section 50b is preferably integrally formed with attachment section 40b, which is preferably integrally formed with transverse portion 22. Moreover, second gripping section 44b is also preferably integrally formed with attachment section 40b, which is preferably integrally formed with transverse portion 22.

Bracket section 52b is preferably formed of hard, rigid plastic material and is releasably coupled to mounting section 50b to form first gripping section 42b. More specifically, mounting section 50b has a first cross-sectional shape (i.e. substantially semi-circular cross-sectional shape) and bracket section 52b has a second cross-sectional shape (i.e. substantially semi-circular cross-sectional shapes), which have flush longitudinal (axial) edges 51b and 53b, respectively. Mounting section 50b includes a pair of longitudinal edges 51b, while bracket section 52b includes a pair of longitudinal edges 53b, which mate together to form an annular gripping surface of first gripping section 42b. Additionally, mounting section 50b includes a curved transverse edge 55b, while bracket section 52b includes a mating curved transverse edge 57b, which mate to form a smooth transition from first gripping section 42b to second gripping section 44b. Thus, when bracket section 52b is coupled to mounting section 50b, flush longitudinal edges 51b and 53b are aligned with each other to form a continuous contoured annular gripping surface (i.e. of first gripping section 42b) with a smooth transition to the second gripping section 44b.

Bracket section 52b is releasably coupled to mounting section 50b by a protrusion in recess arrangement. Specifically, as seen in FIGS. 11 and 12, mounting section 50b includes a longitudinal T-shaped projection 60b extending therefrom and bracket section 52b includes a longitudinal recess or mating slot 62b configured to slidably receive longitudinal projection 60b. More specifically, bracket section 52b preferably has a hollow area. Slot 62b is preferably formed by a pair of opposed flanges 63b. A threaded fastener or bolt 64b is used to fixedly couple bracket section 52b to mounting section 50b.

Mounting section 50b also preferably includes an abutment protrusion 65b and bracket section 52b preferably includes an abutment protrusion 67b, which contact each other within the hollow area of bracket section 52b. Abutment protrusions 65b and 67b have holes formed therein that threadedly receive threaded fastener 64b.

Bracket section 52b preferably includes a second control lever 54b pivotally coupled thereto for controlling a braking device in a conventional manner. Control lever 54b is a brake control lever, which is operatively coupled to a braking device (i.e. rear braking device) of bicycle 10 in a conventional manner. Control lever 54*b* preferably includes a pair of shift control buttons for controlling a derailleur of the bicycle 10 (i.e. the rear derailleur). The shift control buttons of control lever 54*b* are preferably electrically or mechanically coupled to the respective derailleur via a control cable or electrical wires in a conventional manner. Moreover, the shift control buttons are preferably electrically coupled to the cycle computer 20 in a conventional manner. The connections between control lever with the shift buttons with the braking device, derailleur and cycle computer are not critical to the present invention.

A (second) user operable control unit 56*b* is coupled to a free end of first gripping section 42*b*. Specifically, user operable control unit 56*b* is fixedly coupled to bracket section 52*b* via a pair of threaded fasteners or screws 69*b*. More specifically, mounting section 50*b* and bracket section 52*b* each have free ends configured to form a recess at the free end of first gripping section 42*b*. User operable control unit 56*b* is preferably at least partially received in the recess formed at the free end. User operable control unit 56*b* is preferably operatively coupled to the respective derailleur of the bicycle 10 and the cycle computer 20 to control the shifting function of the rear derailleur in a conventional. For example, user operable control unit 56*b* could be electronically or mechanically operatively coupled to the respective derailleur (i.e. rear derailleur) of bicycle 10. Additionally, user operable control unit 56*b* preferably includes a computer-control button (i.e. such as a mode button). The connections between user operable control unit 56*b* with the respective derailleur and cycle computer are not critical to the present invention.

The cycle computer 20 preferably includes a microcomputer formed on a printed circuit board that is powered by a battery unit. The microcomputer of the cycle computer 20 includes a central processing unit (CPU), a random access memory component (RAM), a read only memory component (ROM), and an I/O interface. The various components of the microcomputer are well known in the bicycle field. Therefore, the components used in the microcomputer of the cycle computer 20 will not be discussed or illustrated in detail herein. Moreover, it will be apparent to those skilled in the art from this disclosure that the cycle computer 20 can include various electronic components, circuitry and mechanical components to carryout the present invention. Of course, it will be apparent to those skilled in the art from this disclosure that the cycle computer 20 can have a variety of configurations, as needed and/or desired.

Preferably, the cycle computer 20 provides or displays various information to the rider via a display and operates the electronically controlled drive train. Thus, the front and rear derailleurs of bicycle 10 can be operated or electronically controlled by the cycle computer 20 in a conventional manner or manually (mechanically) operated or controlled in a conventional manner as needed and/or desired. In any event, cycle computer 20 preferably displays information and/or controls various components of the bicycle in a conventional manner. As mentioned above, the connections between the various components of the bicycle with the control levers 54*a* and 54*b*, the user operable control units 56*a* and 56*b*, and the cycle computer 20 are not critical to the present invention. Thus, it will be apparent to those skilled in the art that these elements can be connected and/or operated in any conventional manner as needed and/or desired.

Second Embodiment

Figure 13:
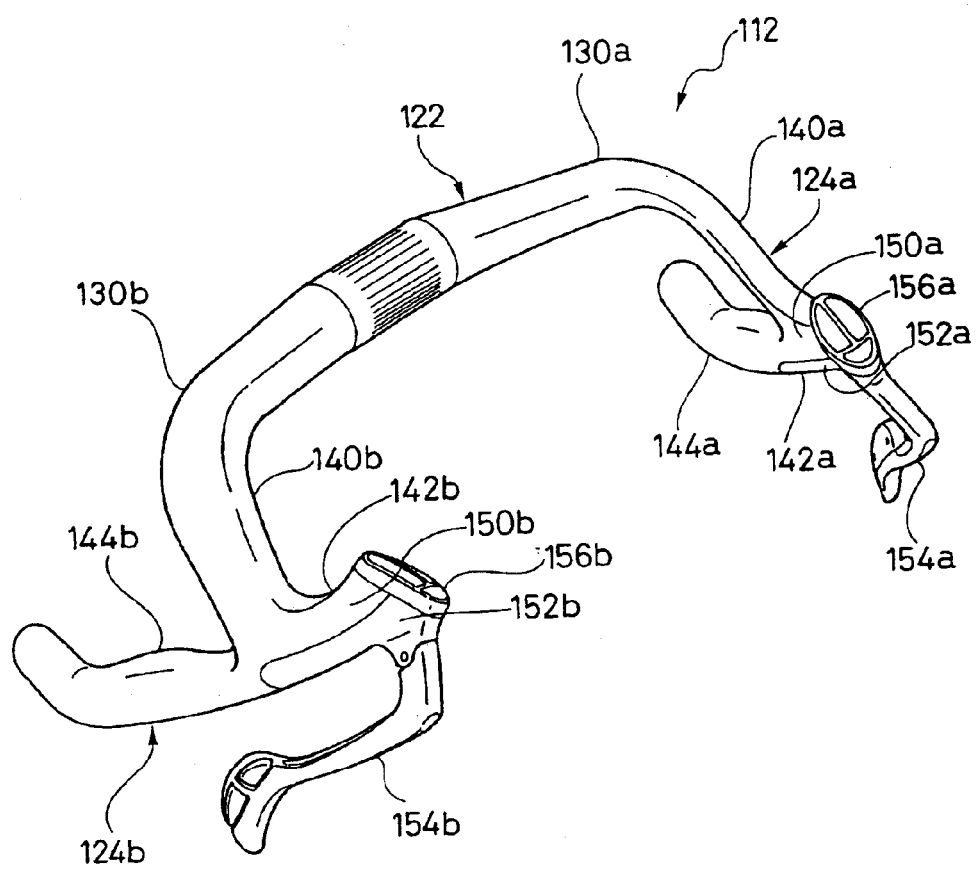
FIG. 13 is an enlarged, perspective view of a bicycle handlebar in accordance with a second embodiment of the present invention.
Figure 14:
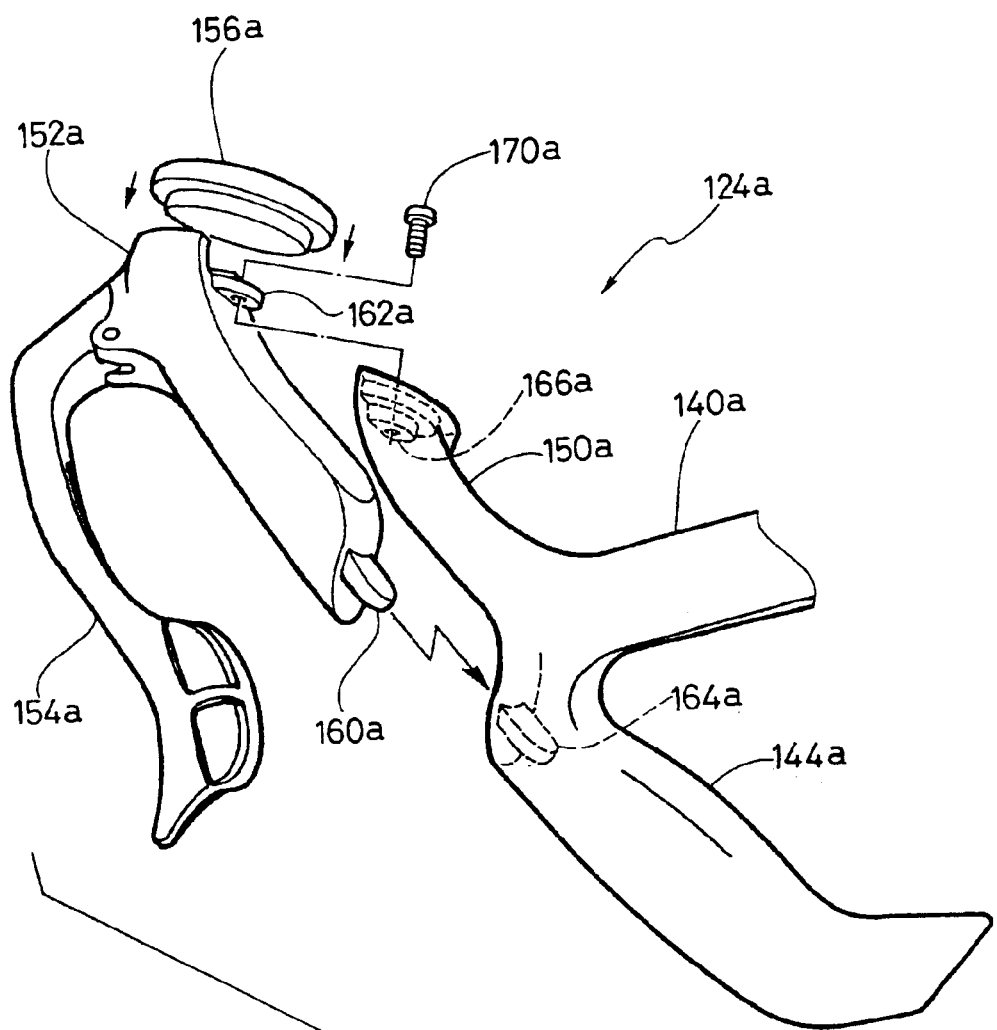
FIG. 14 is an enlarged, exploded reverse perspective view of an outer gripping portion of a bicycle handlebar illustrated in FIG. 13.

Referring now to FIGS. 13 and 14, an alternate handlebar 112 is illustrated in accordance with a second embodiment of the present invention. Basically, handlebar 112 is identical to handlebar 12 of the first embodiment, except that outer gripping portions 124*a* and 124*b* are modified versions of outer gripping portions 24*a* and 24*b* of the first embodiment. More specifically, handlebar 112 utilizes alternate connections between a mounting sections 150*a* and 150*b*, and bracket sections 152*a* and 152*b*, respectively. In view of the similarities between handlebar 112 and 12, the following description of handlebar 112 will focus mainly on the differences. However, it will be apparent to those skilled in the art from this disclosure that most of the description of handlebar 12 applies to the description of handlebar 112.

Handlebar 112 basically includes a transverse portion 122 and a pair of outer gripping portions 124*a* and 124*b* (first and second). Transverse portion 122 is preferably identical to transverse portion 22 of the first embodiment. Thus transverse portion 122 will not be discussed and/or illustrated in detail herein. Outer gripping portions 124*a* and 124*b* are preferably mirror images of each other and similar to the first embodiment. In other words, handlebar 112 is preferably symmetrical relative to a center vertical plane (not shown) of transverse portion 122. Thus only outer gripping portion 124*a* will be discussed in detail herein. However, it will be apparent to those skilled the art that the description of outer gripping portion 124*a* also applies to outer gripping portion 124*b* since these parts are substantially identical.

Specifically, outer gripping portion 124*a* basically includes an attachment section 140*a*, a first gripping section 142*a*, and a second gripping section 144*a*. Attachment section 140*a* is fixedly coupled to an end 130*a* of transverse portion 122. Outer gripping portion 124*b* also basically includes an attachment section 140*b*, a first gripping section 142*b*, and a second gripping section 144*b*. Attachment section 140*b* is fixedly coupled to an end 130*b* of transverse portion 122. First gripping section 142*a* includes a first mounting section 150*a* and a first bracket section 152*a* while first gripping section 142*b* includes a second mounting section 150*b* and a second bracket section 152*b*. First gripping section 142*a* includes a first control lever 154*a* and a first user operable control unit 156*a* coupled thereto, while first gripping section 142*b* includes a second control lever 154*b* and a second user operable control unit 156*b* coupled thereto, in a manner similar to the first embodiment. First and second bracket sections 152*a* and 152*b* are releasably coupled to first and second mounting sections 150*a* and 150*b*, respectively, by (first and second) protrusion and recess arrangements. Only one of the protrusion and recess arrangements will be discussed herein. Specifically, only the protrusion and recess arrangement between bracket section 152*a* and mounting section 150*a* will be discussed herein. However, it will be apparent to those skilled in the art that the description of the protrusion and recess arrangement between bracket section 152*a* and mounting section 150*a* also applies to the protrusion and recess arrangement between bracket section 152*b* and mounting section 150*b*. Moreover, it will be apparent to those skilled in the art that first and second bracket sections 152*a* and 152*b* and first and second mounting sections 150*a* and 150*b* are identical to bracket sections 50*a* and 50*b* and mounting section 50*a* and 50*b* of the first embodiment except the protrusion and recess arrangements therebetween.

More specifically, bracket section 152*a* includes a longitudinally extending protrusion or tab 160*a* and transversely extending protrusion or tab 162*a*. Mounting section 150*a* includes a longitudinal mating recess 164*a* and a transverse mating recess 166*a* configured to receive protrusions 160*a* and 162*a*, respectively. Transverse protrusion 162*a* and transverse recess 166a are configured to receive a threaded fastener or screw 170a to fixedly couple bracket section 152a to mounting section 150a. An enlarged recess is formed at the free ends of bracket section 152a and mounting section 150a. The enlarged recess is configured to receive user operable control unit 156a via a friction fit or snap-fit. Bracket section 152a is illustrated as a substantially solid member in this embodiment. However, it will be apparent to those skilled in the art that bracket section could be formed with a hollow area or areas as needed and/or desired. Moreover, it will be apparent to those skilled in the art that outer gripping portion 124b is identical to outer gripping portion 124a except that outer gripping portion 124b is a mirror image of outer gripping portion 124a. Furthermore, it will be apparent to those skilled in the art that handlebar 112 is identical to handlebar 12 of the first embodiment (i.e. angles, lengths etc.) except for the internal connection between first and second bracket sections 152a and 152b with first and second mounting sections 150a and 150b, respectively. Therefore, handlebar 112 will not be discussed in further detail herein.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle component operating device comprising:

an outer gripping portion configured to be coupled to a bicycle handlebar;

a brake lever pivotally coupled to said outer gripping portion about a pivot axis, said brake lever including a first free end pivotally coupled to said outer gripping portion, a second free end and a center portion extending between said first and second free ends; and an electric shift control button located at said second free end of said brake lever, said second free end including a side surface that faces in a direction substantially parallel to said pivot axis, and said electric shift control button having an operating surface that faces in said direction substantially parallel to said pivot axis.

2. The bicycle component operating device according to claim 1, further comprising an additional electric shift control button located at said second free end.

3. The bicycle component operating device according to claim 2, wherein said free end includes a side surface that faces in a direction substantially parallel to said pivot axis, and each of said electric shift control buttons has an operating surface that faces in said direction substantially parallel to said pivot axis.

* * * * *